United States Patent
Pettay et al.

(10) Patent No.: US 9,253,329 B1
(45) Date of Patent: Feb. 2, 2016

(54) SERVICES VIA A CONFERENCE BRIDGE

(75) Inventors: Mark J. Pettay, Omaha, NE (US); Myron P. Sojka, Logan, IA (US); Hendryanto Rilantono, Omaha, NE (US); Mark Steven Jarzynka, Omaha, NE (US); Gregory Stuart Cardin, Omaha, NE (US); Bernard Roubaud, Castelnau le lez (FR)

(73) Assignee: West Corporation, Omaha, NE (US)

( * ) Notice: Subject to any disclaimer, the term of this patent is extended or adjusted under 35 U.S.C. 154(b) by 102 days.

(21) Appl. No.: 13/373,710

(22) Filed: Nov. 28, 2011

Related U.S. Application Data

(63) Continuation-in-part of application No. 13/157,660, filed on Jun. 10, 2011.

(51) Int. Cl.
| | |
|---|---|
| *H04M 3/00* | (2006.01) |
| *H04M 5/00* | (2006.01) |
| *H04M 3/56* | (2006.01) |
| *H04M 3/523* | (2006.01) |

(52) U.S. Cl.
CPC ............. *H04M 3/56* (2013.01); *H04M 3/5233* (2013.01)

(58) Field of Classification Search
CPC .............................................. H04M 2203/5009
USPC .................. 379/202.01, 205.01, 158, 265.12
See application file for complete search history.

(56) References Cited

U.S. PATENT DOCUMENTS

| | | | | |
|---|---|---|---|---|
| 8,520,833 | B1 * | 8/2013 | Pettay et al. | 379/265.12 |
| 2005/0251421 | A1 * | 11/2005 | Chang et al. | 705/2 |
| 2006/0120307 | A1 * | 6/2006 | Sahashi | 370/259 |
| 2012/0029303 | A1 * | 2/2012 | Shaya | 600/300 |

* cited by examiner

*Primary Examiner* — Alexander Jamal

(57) ABSTRACT

Embodiments of the present invention pertain to an apparatus, a method, and a computer program configured to transmit messages between a plurality of devices during a conference call and connect the plurality of devices to a service provider based on a request for at least one service. The transmitted messages can be audio messages or audio and video messages.

19 Claims, 10 Drawing Sheets

SERVICES VIA A CONFERENCE BRIDGE

RELATED APPLICATION INFORMATION

This application is a Continuation-in-Part of co-pending U.S. application Ser. No. 13/157,660, filed Jun. 10, 2011, entitled "Global Interpreter/Translation. Services via Conference Bridge", herein incorporated by reference.

FIELD

The present invention relates to conferencing services and, more particularly, to services provided to a plurality of users during a conference call.

BACKGROUND

During a conference call, there may be a plurality of users speaking to one another. However, there may be instances when a user requires additional services during the conference call, such as an interpreter, answers to legal questions, medical questions, human resource questions, etc. In those instances, a third party service provider is needed to connect to the conference call to assist with the requested services.

SUMMARY

Certain embodiments of the present invention may provide solutions to the problems and needs in the art that have not yet been fully identified, appreciated, or solved by current service systems.

In accordance with an embodiment of the present invention, a computer-implemented method is provided. The method includes transmitting messages between a plurality of devices during a conference call, receiving information from a plurality of service providers, and connecting the plurality of devices to a service provider based on a request for at least one service. The transmitted messages can be audio messages or audio and video messages. In some embodiments, for each service provider, the information may include information regarding at least a profession of the service provider, a skill set of the service provider, an availability of the service provider, a location of the service provider, a dialect of the service provider, fees for services provided by the service provider, a gender of the service provider, a score based on knowledge of the service provider, and a performance quality of the service provider.

In yet another embodiment of the present invention, an apparatus is provided that includes a processor and memory including instructions. The processor is configured to transmit messages between a plurality of devices during a conference call and connect the plurality of devices to a service provider based on a request for at least one service. The transmitted messages can be audio messages or audio and video messages.

In accordance with another embodiment of the present invention, a computer program embodied on a non-transitory computer-readable medium is provided. The computer program is configured to cause the processor to transmit messages between a plurality of devices during a conference call and connect the plurality of devices to a service provider based on a request for at least one service. The transmitted messages can be audio messages or audio and video messages.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One or more embodiments described herein relate to an integration with a global bridging platform from an agent or other platform that allows a bridge for bridging of multiple people into a conference call with a translator that is situated somewhere globally. In other words, embodiments of the present invention provide for a platform that bridges a plurality of people into a conference call with a translator.

Figure 1:
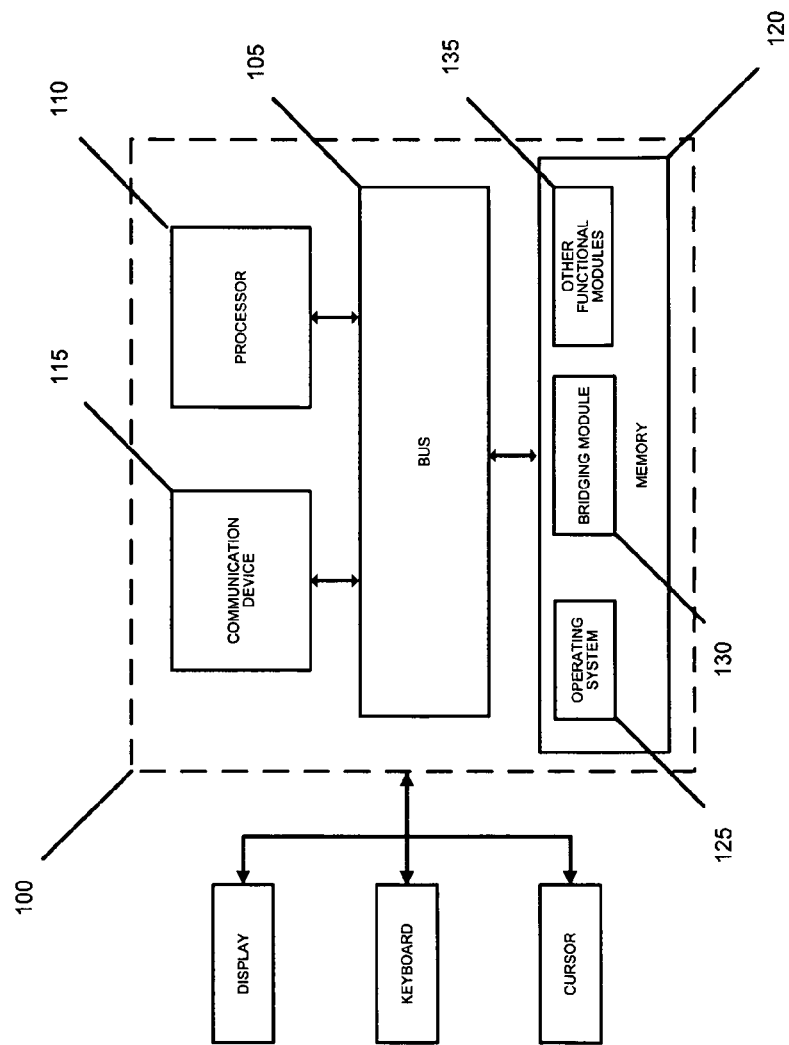
FIG. 1 illustrates a block diagram of a system that can be implemented in one or more embodiments of the present invention.

FIG. 1 illustrates a block diagram of a system 100 that can be implemented in one or more embodiments of the present invention. System 100 may include a bus 105 or other communication mechanism that can communicate information and a processor 110, coupled to bus 105, that can process information. Processor 110 can be any type of general or specific purpose processor. System 100 may also include a memory 120 that can store information and instructions to be executed by processor 110. Memory 120 can be comprised of any combination of random access memory ("RAM"), read only memory ("ROM"), static storage such as a magnetic or optical disk, or any other type of non-transitory computer readable medium. System 100 may also include a communication device 115, such as a network interface card, that may provide access to a network.

The computer readable medium may be any available media that can be accessed by processor 110. The computer readable medium may include both volatile and nonvolatile media, removable and non-removable media, and communication media. The communication media may include computer readable instructions, data structures, program modules, or other data and may include any information delivery media.

Processor 110 can also be coupled via bus 105 to a display 140, such as a Liquid Crystal Display ("LCD"). Display 140 may display information to the user. A keyboard 145 and a cursor control unit 150, such as a computer mouse, may also be coupled to bus 105 to enable the user to interface with system 100.

According to one embodiment, memory 120 may store software modules that may provide functionality when executed by processor 110. The modules can include an operating system 125 and a bridging module 130, as well as other functional modules 135. Operating system 125 may provide operating system functionality for system 100. Because system 100 may be part of a larger system, system 100 may include one or more additional functional modules 135 to include the additional functionality, such as an IICP translator application.

Figure 2:
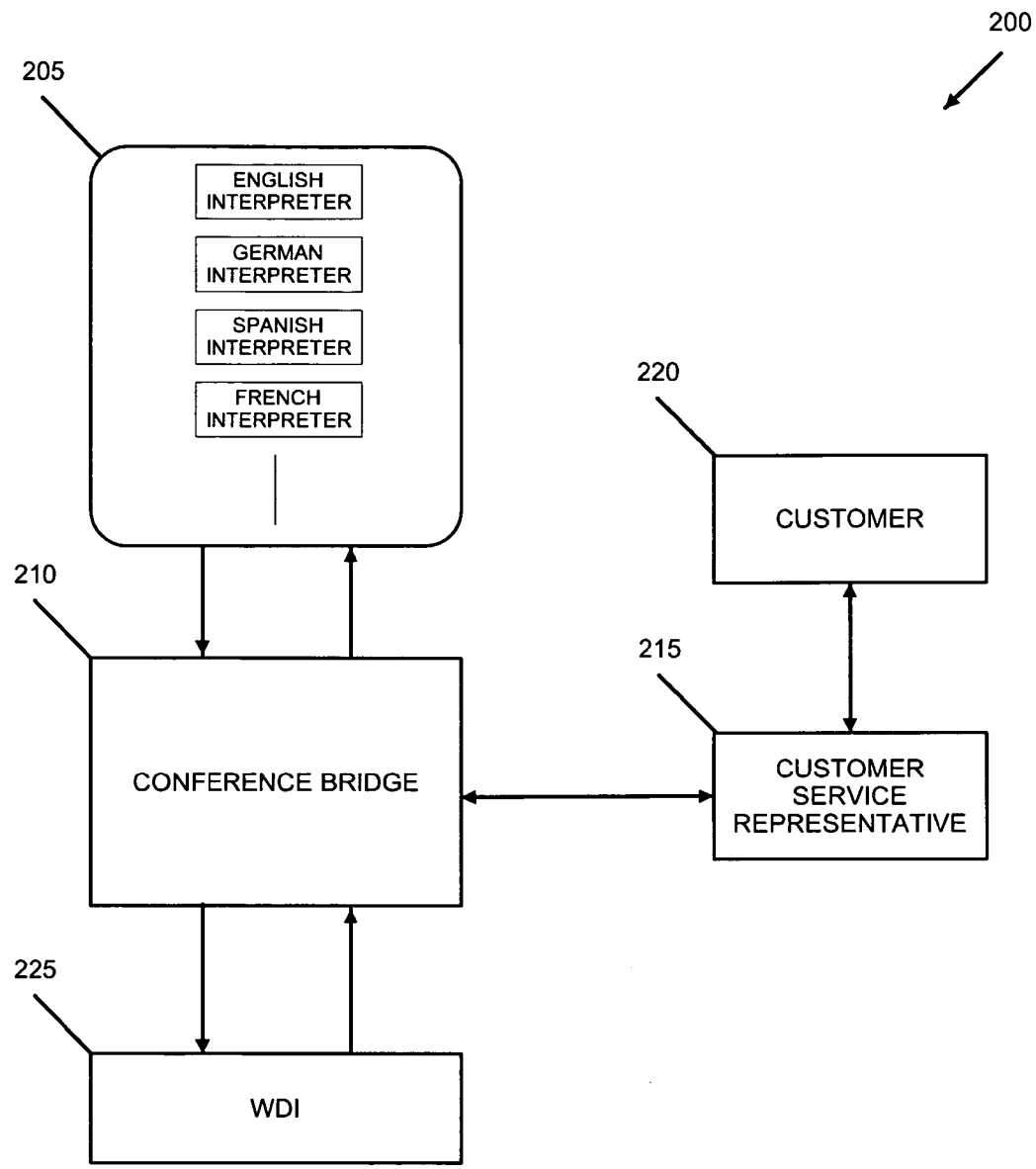
FIG. 2 illustrates a conference bridging system, in accordance with an embodiment of the present invention.

FIG. 2 illustrates a conference bridging system 200, in accordance with an embodiment of the present invention. System 200 includes a holding area 205 having one or more interpreters, a conference bridge 210, a customer service representative (CSR) 215, a user or customer 220, and a WDI 225. Interpreters can provide language support, i.e., translate between an English speaking customer and a German-speaking agent. Conference Bridge (or V2 Conference Bridge) 210 is configured to connect the interpreter to conference holding area 205 after the interpreter has been authenticated. WDI 225 is configured to provide interpreter state data.

In this embodiment, the interpreter dials into Conference Bridge 210, authenticates, indicates their language of expertise, and enters into a "music on hold" (MOH) state, which is conference holding area 205. The interpreter remains in such a state until CSR 215 selects the interpreter and connects customer 220 to the interpreter.

For instance, when CSR 220 determines that an interpreter is beneficial or required, operator 220 connects to Conference Bridge 210, authenticates, specifies a language, and engages interpreter 205 with customer 215.

Figure 3:
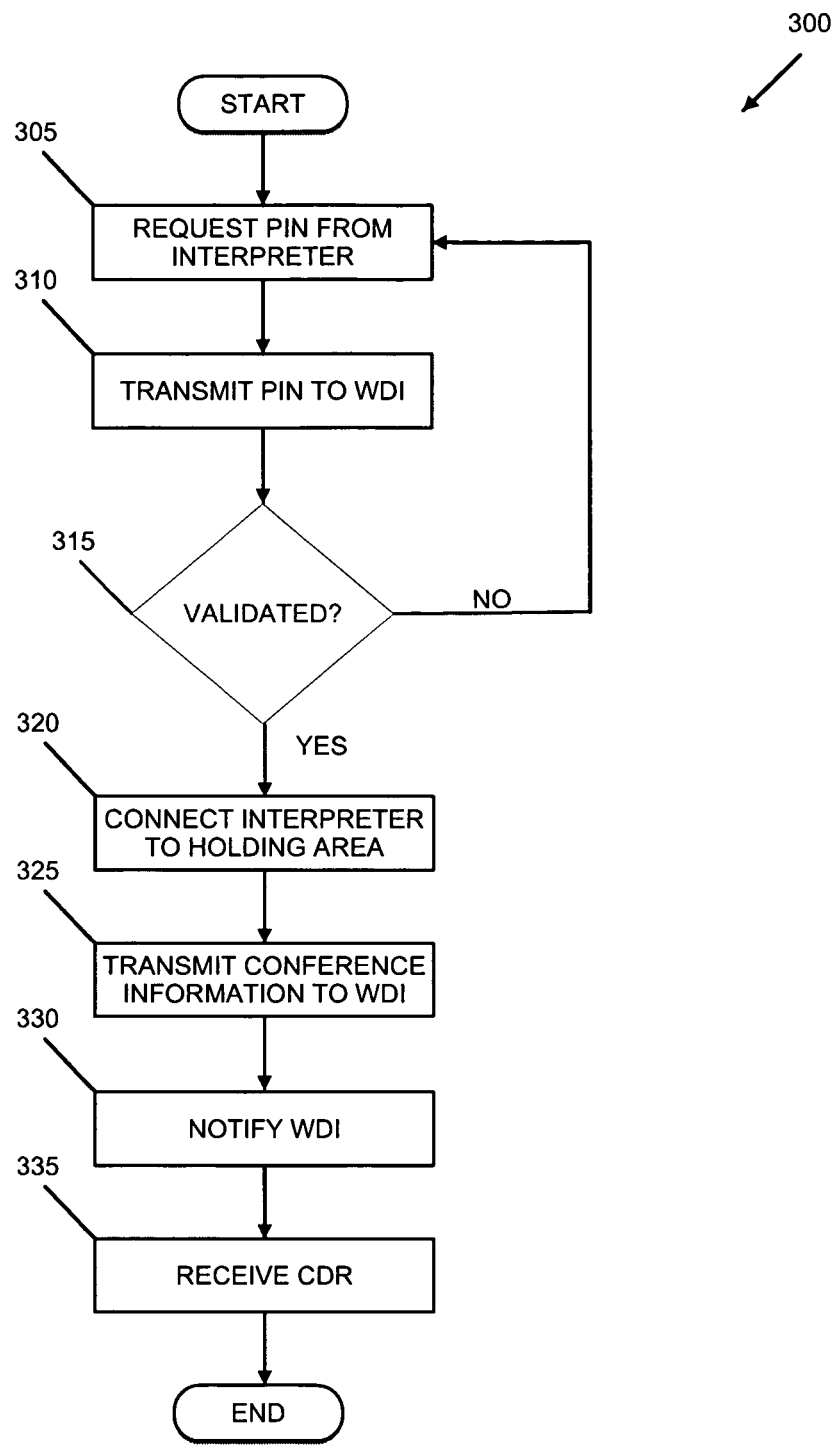
FIG. 3 illustrates a method for registering an interpreter, in accordance with an embodiment of the present invention.

FIG. 3 illustrates a method 300 for registering an interpreter, in accordance with an embodiment of the present invention. When an interpreter dials in (i.e., connects) to a conference bridge, the conference bridge at 305 requests that the interpreter submit a personal identification number (PIN). At 310, the bridge receives the PIN from the interpreter and transmits the PIN to WDI for validation. The PIN is utilized to authenticate and/or validate the interpreter, as well as identify the languages the interpreter is fluent in. Also, the PIN includes a number of digits that are used to validate the interpreter to the WDI.

At 315, the WDI determines if the PIN is valid or invalid. If the PIN is invalid, the bridge is notified and requests the interpreter to re-enter at 305 the PIN in order to validate the interpreter. If the PIN is valid, the bridge is notified and connects at 320 the interpreter to a conference holding area where the interpreter can, for example, listen to music while placed on hold. At 325, the bridge also transmits conference information regarding the interpreter to the WDI. For instance, the conference information can include, but is not limited to, a unit number, a line number, a setup time, a language identifier, a conference passcode, a conference identifier, a sub-conference identifier, and a state of the call. If necessary, the WDI can respond to the bridge with the unit number, the line number, the setup time, and a result.

In this embodiment, the unit number and the line number may be a four digit random number. The setup time can be a ten-digit time stamp, and the language indicator can be a three-digit language code. The conference passcode can be a sixteen-digit passcode, and the conference and the sub-conference identifiers can be a 60-byte identifier. The state of the call can indicate whether the parties are in a conference or whether the parties left the conference.

When the interpreter is disconnected or hangs up, the bridge transmits at 330 a message to the WDI notifying that the interpreter is no longer in the conference holding area or is no longer on a conference call. In response, the bridge receives a call data record (CDR) of the conference call.

Figure 4:
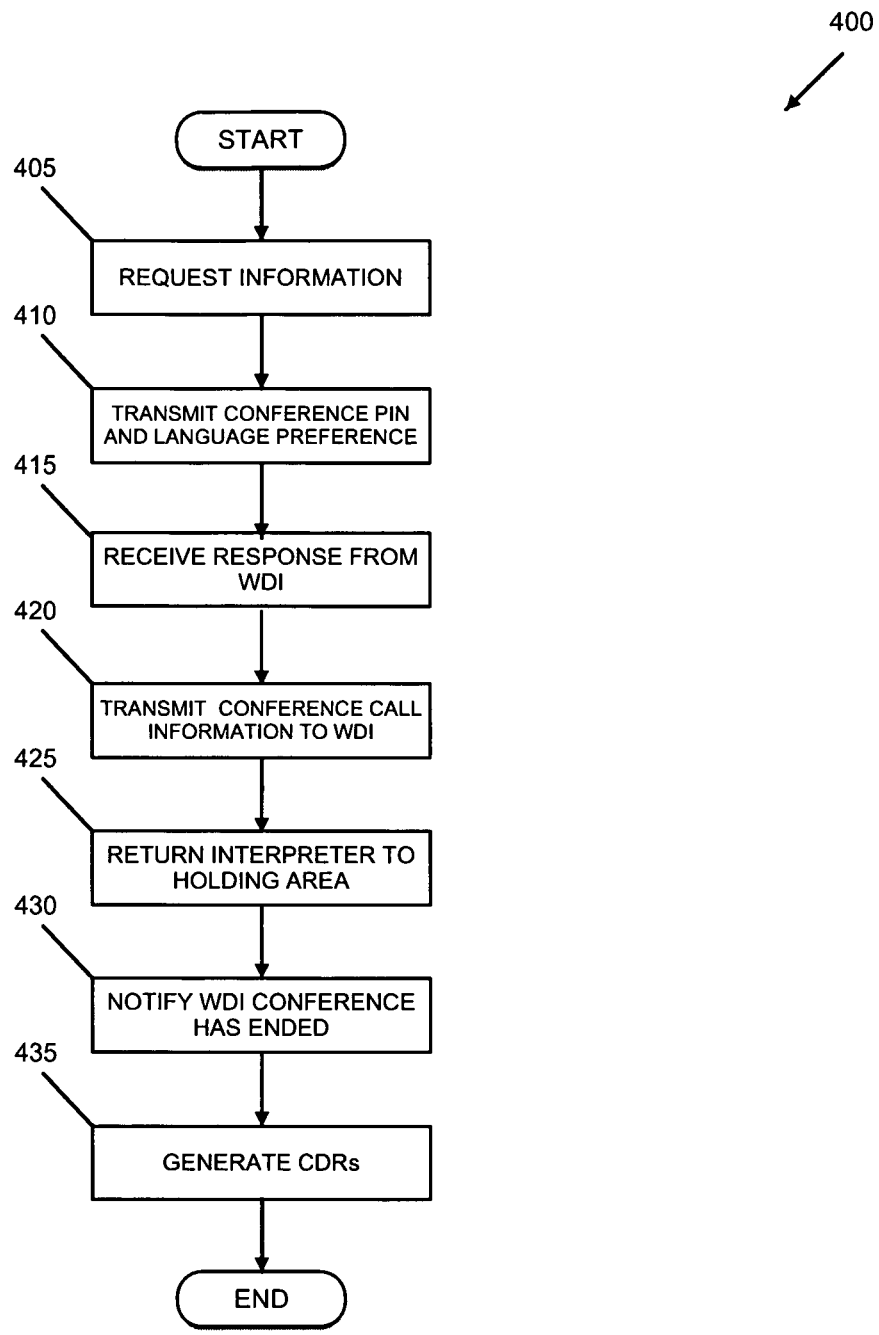
FIG. 4 illustrates a method for connecting an interpreter to a conference, in accordance with an embodiment of the present invention.

FIG. 4 illustrates a method 400 for connecting an interpreter to a conference, in accordance with an embodiment of the present invention. Generally, when a customer contacts a customer service representative (CSR) at a call center, the customer presumes that the CSR speaks the same language as the customer. However, this may not be the case in some instances. When either the CSR or the customer, or both, determine that an interpreter is required in order to translate between the CSR and the customer, the CSR can connect to a conference bridge utilizing a dedicated number. It should be appreciated that the CSR can also connect to the bridge utilizing a hyperlink or any other method that may be appreciated by a person of ordinary skill in the art.

When the CSR connects to the bridge, the bridge at 405 transmits a request for information either simultaneously or sequentially. The information being requested can be a conference personal identification number (PIN) to identify the CSR and a language preference. It should be appreciated that more than one language can be selected in the case where the customer and/or the CSR understand more than one language.

At 410, the bridge transmits the conference PIN and the language preference to the WDI. In particular, the conference PIN can be any number of digits that validates the CSR, and the language preference may be, but is not limited to, a three-digit code. At 415, the bridge receives call information, including the conference code and interpreter information, in order to connect to the appropriate interpreter. The call information can also include a unit name, a line name, a setup time, a language identifier, a conference passcode, a conference identifier, a sub-conference identifier, and a result indicating whether the request is valid or invalid.

At 420, when the CSR and customer are connected to the appropriate interpreter by the IICP, the bridge transmits to the WDI information regarding a conference start time. The information can include a conference passcode, a conference identifier, and a timestamp to indicate the start of the conference. When the conference has ended, the bridge at 425 returns the interpreter to the holding area so the interpreter can wait for the next conference when needed.

At 430, the bridge notifies the WDI that the conference has ended. The notification can include the PIN, the conference identifier, and a time stamp to indicate when the conference ended. At 435, when the conference ends, a CDR regarding the operator's call log and the interpreter's call log is generated, as well as the conference CDR.

Figure 5:
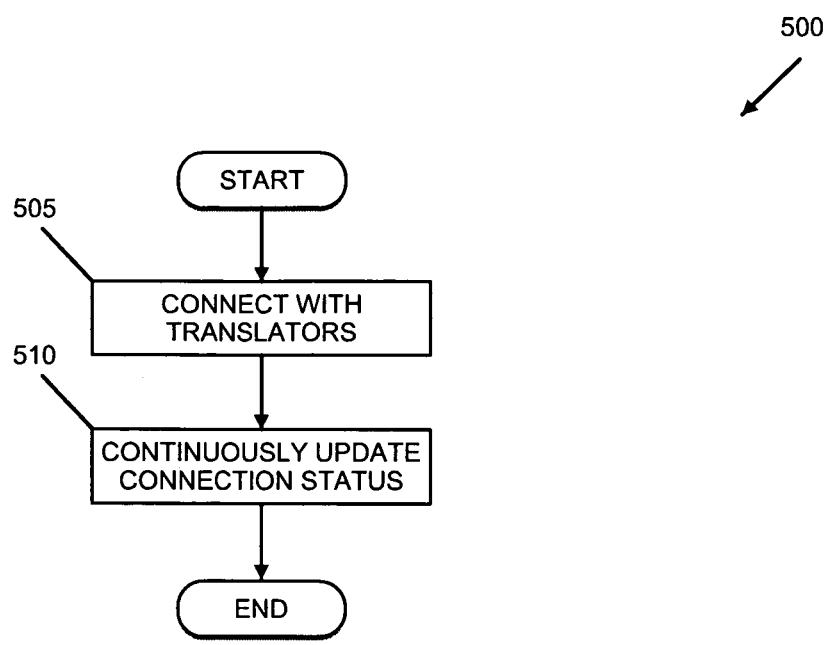
FIG. 5 illustrates a method for an IICP translator application updating the WDI of interpreter dial-ins, in accordance with an embodiment of the present invention.

FIG. 5 illustrates a method 500 for an IICP translator application updating the WDI of interpreter dial-ins, in accordance with an embodiment of the present invention. In this embodiment, the translator is presumed to be a Web service. At 505, one or more interpreters connect to the IICP translator application. As interpreters dial into an IICP translator application, the interpreters' information is relayed at 510 to the WDI application. The information may include a unit number (four-digit identifier), a line number (four-digit identifier), a setup timestamp, a language indicator (two-digit language code), a conference passcode (sixteen-digit passcode), a conference identifier (sixty-byte conference identifier), and a sub-conference identifier (sixty-byte sub-conference identifier).

Figure 6:
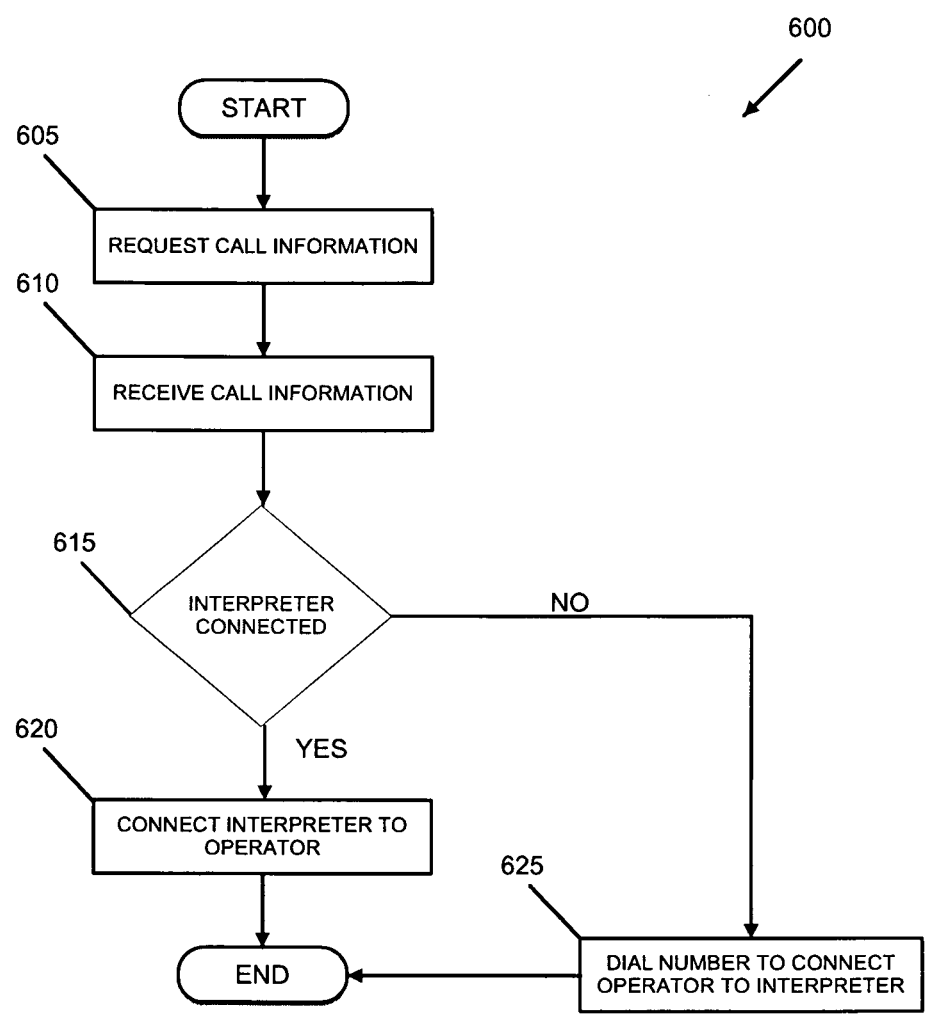
FIG. 6 illustrates a method for retrieving interpreter call information from the WDI, in accordance with an embodiment of the present invention.

FIG. 6 illustrates a method 600 for retrieving interpreter call information from the WDI, in accordance with an embodiment of the present invention. At 605, the IICP translator application requests call information from the WDI. At 610, the IICP translator application receives the call information having a unit number, a line number, a setup time, a language indicator, a conference passcode, a conference identifier, a sub-conference identifier, and a phone number. At 615, a determination is made as to whether the interpreter is dialed in or not. If the interpreter is not dialed into the conference, then at 620 the IICP translator application is configured to perform connect or bridge the interpreter to the operator (i.e., CSR) via the phone number. If the interpreter is dialed into the conference, then the IICP translator application connects at 625 the interpreter to the operator utilizing the call information received from the WDI.

Figure 7:
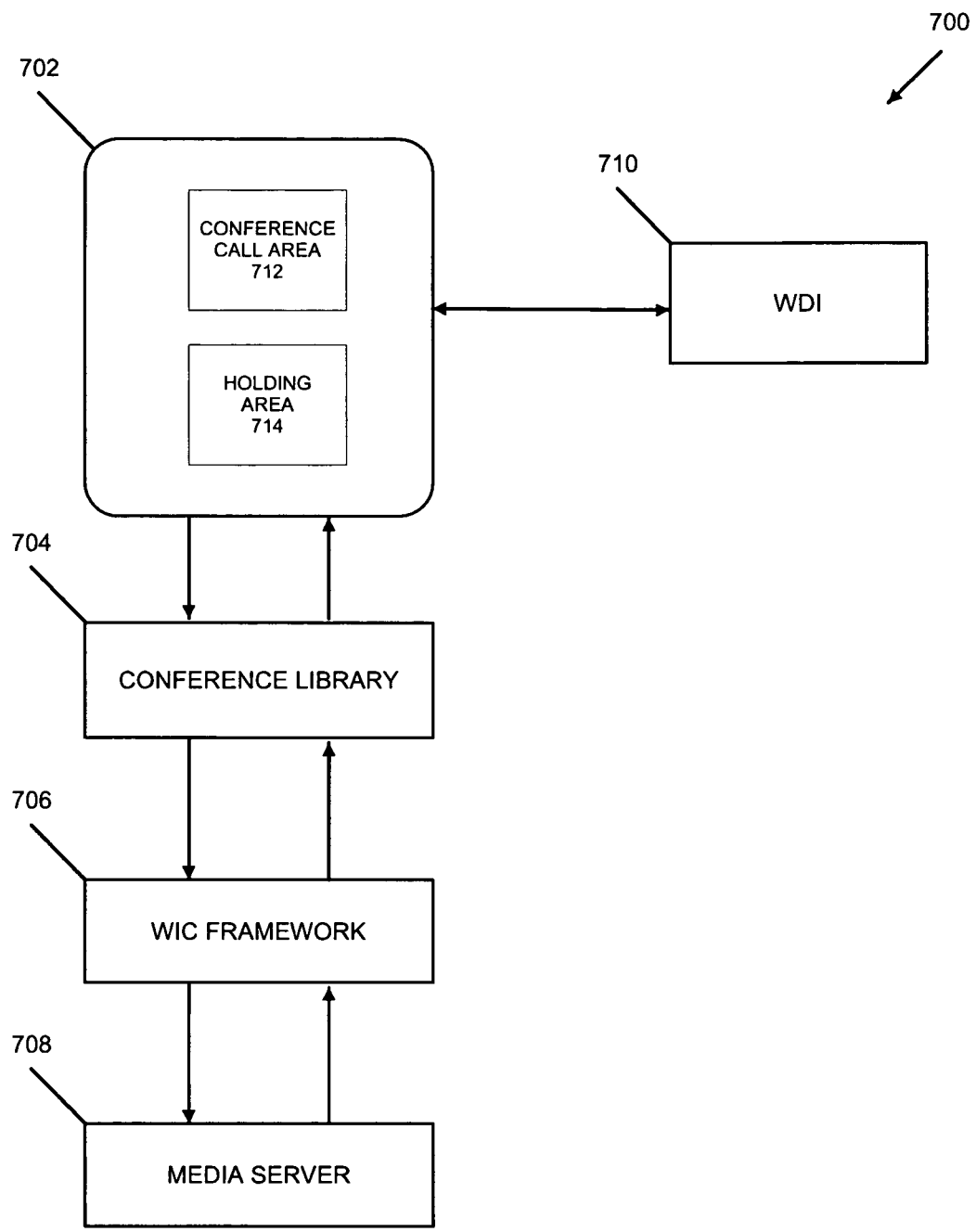
FIG. 7 illustrates a system that connects an interpreter with a caller, in accordance with an embodiment of the present invention.

FIG. 7 illustrates a system 700 that connects an interpreter with a caller, in accordance with an embodiment of the present invention. System 700 includes a translator module 702, a conference library module 704, a WIC framework module 706, media server module 708, and a WDI module (or verification unit) 710. Translator module 702 includes a conference call area 712 and a holding area 714, and is operatively connected to WDI module 710.

In this embodiment, a translator (or interpreter) such as a Spanish interpreter connects to translator module 702 by dialing a dedicated or non-dedicated number. Translator module 702 transmits a welcome message and prompts the translator to enter a Personal Identification Number (PIN). The PIN can be numerical and/or alphanumerical and can be four digits, five digits, etc.

Upon receipt of the PIN, translator module 702 transmits a request to WDI module 710 in order to validate the translator's PIN. WDI module 710 queries a database to determine whether the translator's PIN is valid. If the PIN is valid, translator module 702 receives a validation message from WDI module 710 and transmits a registration message to WDI module 710 in order to register the translator. If the PIN is invalid, translator module 702 transmits a message to the translator that the PIN enter was invalid and requests the translator to reenter the PIN. It should be appreciated that translator module 702 may include a mechanism to allow the translator to reenter the PIN a predetermined number of times before blocking the translator from system 700.

Once the translator is registered in WDI module 710, translator module 702 places the translator in a holding area 714 with music. Translator module 702 also transmits a message instructing the translator to wait in holding area 714 until a customer is connected to the translator.

For example, when a customer dials a dial in number to connect to a customer agent, the customer receives a welcome message from translator module 702. Translator module 702 then transmits a message requesting the customer to enter a conference PIN. Once the customer enters the PIN, translator module 702 prompts the customer to select an interpreter language. For example, the customer is requested to select "1" for Spanish, "2" for English, "3" for French, etc.

When, for example, the customer selects "1" for Spanish, translator module 702 transmits a message to the customer indicating that translator module 702 is connecting the customer to the Spanish translator. During this time, translator module 702 transmits a request for a translator to WDI module 710 identifying the Spanish translator, and receives a call-ID message of the Spanish interpreter from WDI module 710.

Translator module 702 transmits a message to the Spanish translator indicating that the translator is being connected to the customer. In order to connect the Spanish translator to the customer, translator module 702 transmits a conference start message to WDI module 710 in order to start the conference call. As a result, the customer and the translator are connected to the conference call (e.g., conference call area 712) and the translator and customer can speak with each other.

If the customer disconnects from the conference call, conference module 702 places the translator into the holding area 714 and informs the translator accordingly. Translator module 702 also transmits a message to WDI module 710 to end the conference call between the customer and the translator. In an alternative embodiment, if the translator disconnects from the conference call, translator module 702 transmits an option menu to the customer and informs the customer that the translator is disconnected from the call and is requested to enter the interpreter language, if needed. Also, translator module 702 instructs WDI module 710 to end the conference call and to unregister the translator.

Figure 8:
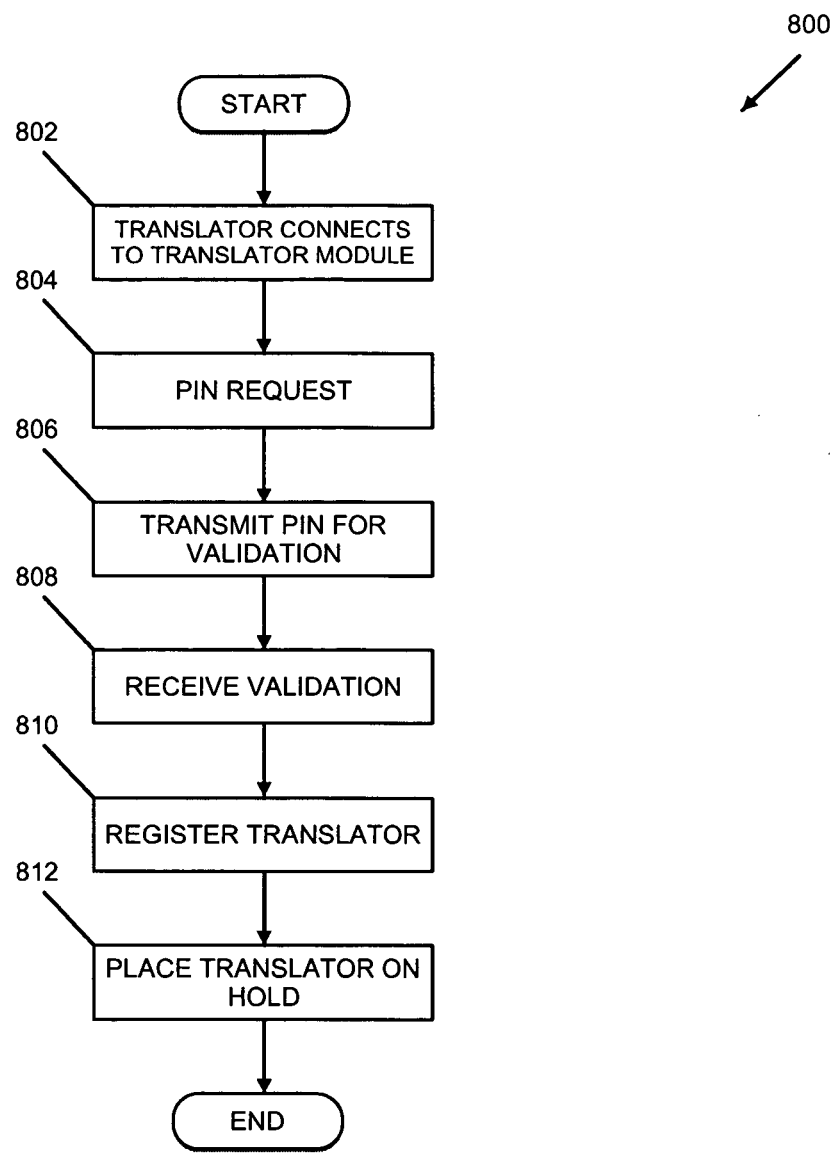
FIG. 8 illustrates a method for a translator to connect to a holding area, in accordance with an embodiment of the present invention.

FIG. 8 illustrates a method 800 for a translator to connect to a holding area, such as a holding area, in accordance with an embodiment of the present invention. At 802, a translator connects to a translator module and the system plays a welcome message to the translator. The translator module then requests that the translator enter a PIN at 804. At 806, the translator module transmits a request to the WDI module in order to validate the PIN, and receives a validation message at 808. In response to the validation message, the translator module requests that the WDI module register the translator at 810 and places the translator into a holding area at 812.

Figure 9:
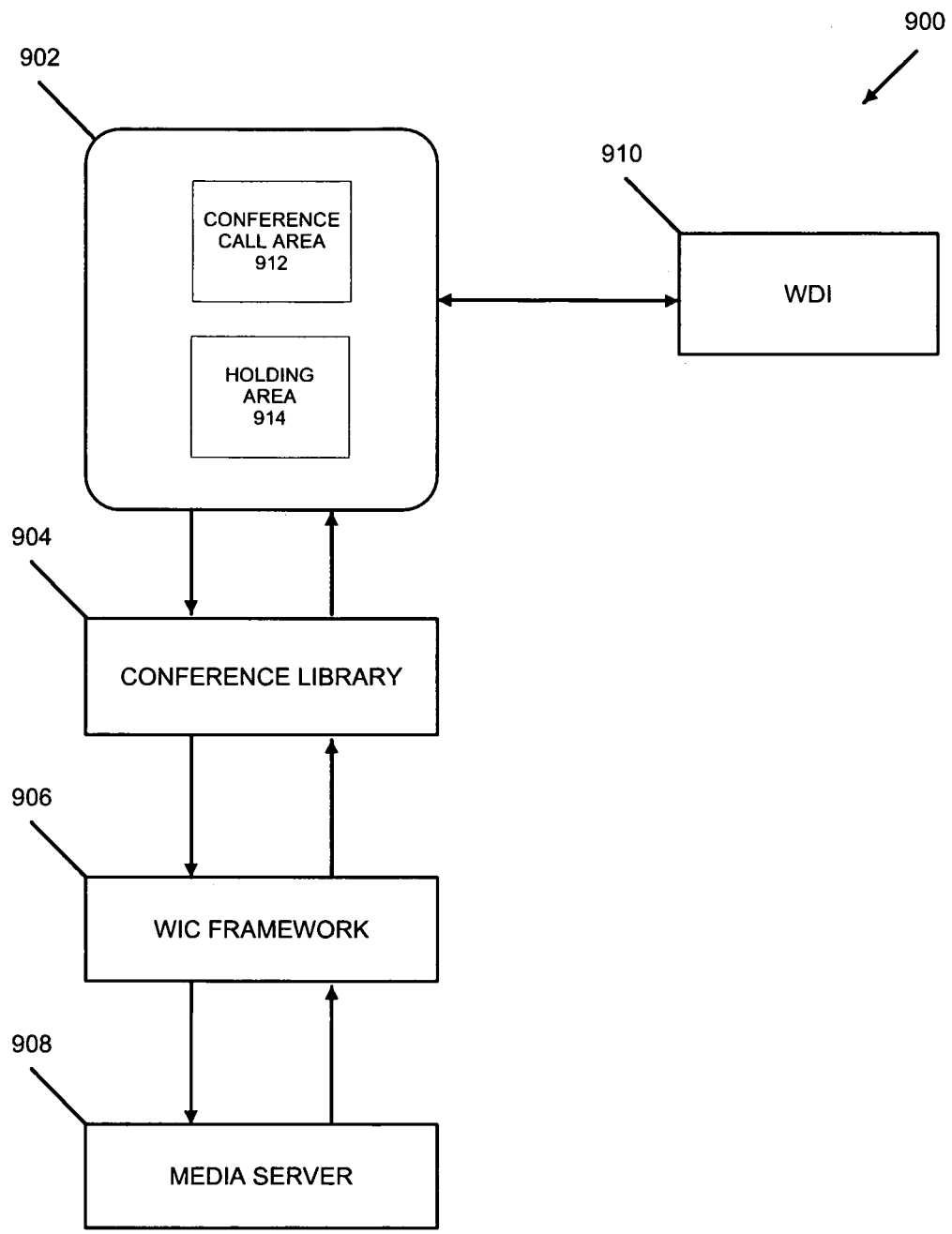
FIG. 9 illustrates a system that connects an interpreter with a caller, in accordance with an embodiment of the present invention.

FIG. 9 illustrates a system 900 that connects an interpreter with a caller, in accordance with an embodiment of the present invention. FIG. 9 includes similar modules to those shown in FIG. 7. In this embodiment, a translator connects to system 900 by dialing a phone number and a welcome message is played. Translator module 902 requests that the translator enter a PIN and, upon receipt of the PIN, translator module 902 transmits a request to WDI module 910 in order to validate the translator. If the PIN is valid, then translator module 902 receives a confirmation from WDI module 910 that the PIN associated to the translator is valid and places the translator in a holding area 914.

When the customer dials a number to connect with a customer agent, the customer is connected to system 900, at which point a welcome message is played. Translator module 902 requests that the customer enter a conference PIN and, upon receipt of the conference PIN, translator module 902 prompts the customer to select the language, e.g., "1" for Spanish, "2" for French, etc.

When the customer selects the language, translator module 902 informs the customer that a translator is being connected to the conference call. In this embodiment, translator module 902 transmits a request for a translator message to WDI module 910 and receives a caller ID of the translator for the language selected by the customer.

Translator module 902 transmits a message to the translator indicating that a customer is being connected, and transmits a message to WDI module 910 to begin the conference call with the customer. Once connected, the customer and translator speak with each other, and the customer requests that the translator connect to a participant. The request includes a name and phone number of the participant in some embodiments.

The translator then dials "0", for example, and is prompted to enter the telephone number of the participant. The entered telephone number is replayed to the translator for confirmation and is connected to the participant. When the participant answers the call, the participant is prompted with a welcome message and is informed that the participant is being connected to a translator.

Once connected, the participant, the customer, and translator can speak with one another. Once the translator hangs up, translator module 902 provides the customer with an option menu and is informed that the translator has been disconnected from the conference. Translator module 902 also disconnects the participant from the conference call by transmitting a message to WDI module 910 to end the conference call, as well as a message to unregister the translator from the conference call.

Figure 10:
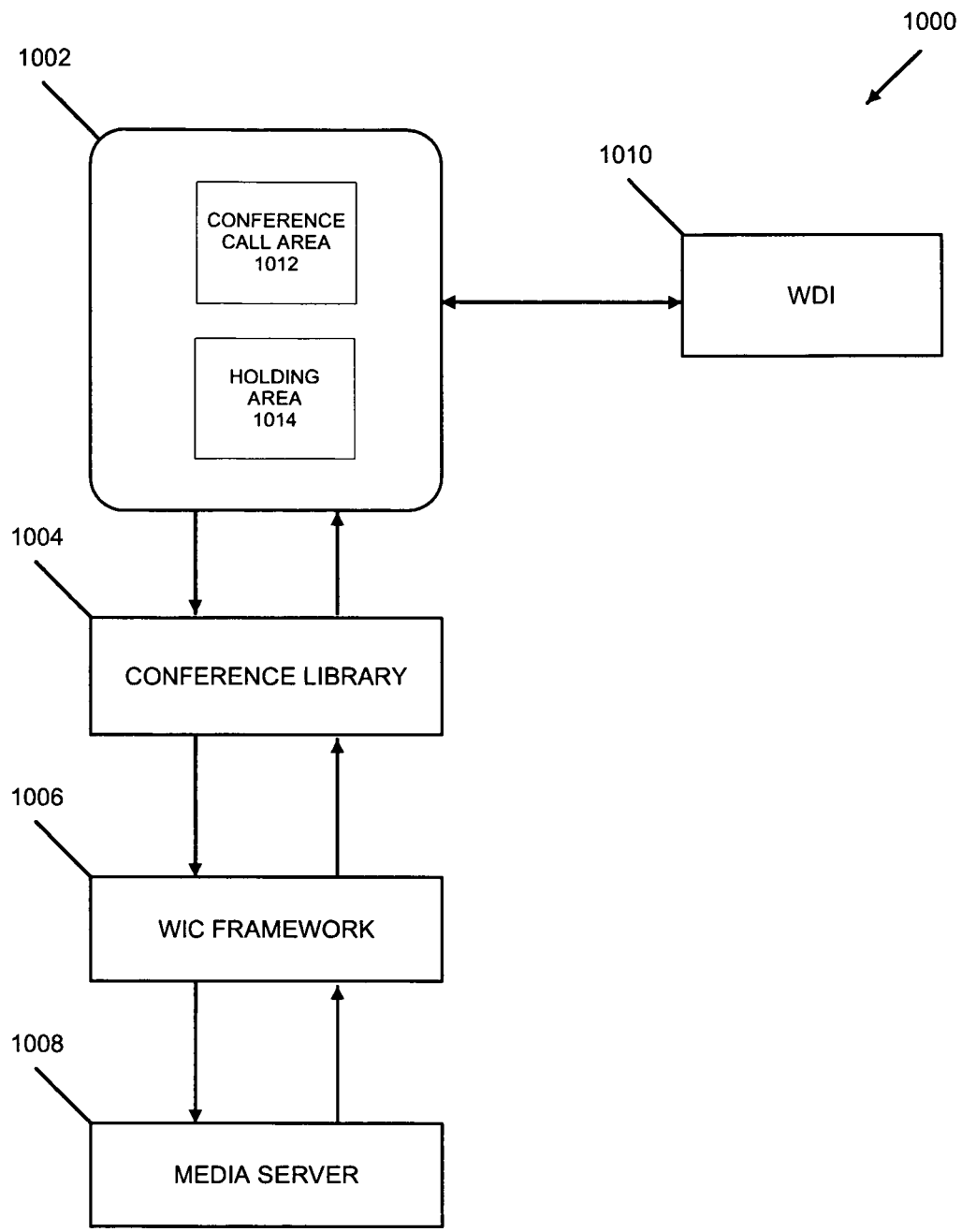
FIG. 10 illustrates a system that connects a translator to a customer, in accordance with an embodiment of the present invention

FIG. 10 illustrates a system 1000 that connects a translator to a customer, in accordance with an embodiment of the present invention. Similar to FIG. 7, FIG. 10 includes similar module to those shown in FIG. 7.

In this embodiment, when a customer connects to system 1000, a welcome message is played. Translator module 1002 then prompts the customer to enter a conference PIN. Upon receipt of the PIN, translator module 1002, for example, prompts the customer to enter a translator language. When the translator language is received from the customer, translator module 1002 transmits a message to WDI module 1010 to request a translator for the customer. If there is no translator available, translator module 1002 receives a response from WDI module 1010 that a translator is not available. The response also includes a phone number of a translator for the customer to connect with.

Translator module 1002 connects to the translator and informs the customer that the customer is being connected to a translator. When the translator picks up, the translator is provided with a welcome message and is informed that the translator is being connected to the customer. For instance, translation module 1002 transmits a message to WDI module 1010 to start or begin the conference call between the customer and translator. As a result, the translator and customer are able to speak with each other.

If the customer hangs up, then translator module 1002 informs the translator of the customer's action and disconnects the translator from the conference by transmitting a message to WDI module 1010. If, however, the translator hangs up, then translator module 1002 informs the customer of the translator's action and is requested to enter a language for translation. Also, translator module 1002 transmits a message to WDI module 1010 to end the conference call between the translator and the customer.

The method steps shown in FIGS. 3-6 and 8 may be performed, in part, by a computer program product, encoding instructions for a nonlinear adaptive processor to cause at least the methods described in FIGS. 3-6 and 8 to be performed by the apparatuses discussed herein. The computer program product may be embodied on a non-transitory computer readable medium. The computer readable medium may be, but is not limited to, a hard disk drive, a flash device, a random access memory, a tape, or any other such medium used to store data. The computer program product may include encoded instructions for controlling the nonlinear adaptive processor to implement the method described in FIGS. 3-6 and 8, which may also be stored on the computer readable medium.

The computer program product can be implemented in hardware, software, or a hybrid implementation. The computer program product can be composed of modules that are in operative communication with one another, and which are designed to pass information or instructions to display. The computer program product can be configured to operate on a general purpose computer, or an application specific integrated circuit ("ASIC").

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for dynamic conferencing during a conference call, comprising:
   transmitting messages between a plurality of devices during the conference call;
   receiving information from a plurality of service providers; and
   connecting the plurality of devices to a service provider based on a request for at least one service during the conference call, wherein
   the messages comprise audio messages, video messages, or both, and
   for each service provider, the information comprises information regarding at least a profession of the service provider, a skill set of the service provider, an availability of the service provider, a location of the service provider, a dialect of the service provider, fees for services provided by the service provider, a gender of the service provider, a score based on knowledge of the service provider, and a performance quality of the service provider.

2. The computer-implemented method of claim 1, further comprising:
   receiving a request from at least one of the plurality of devices for the at least one service,
   wherein the request comprises a type of service requested by the at least one of the plurality of devices.

3. The computer-implemented method of claim 2, further comprising:
   selecting one or more service providers from the plurality of service providers based on the request for the at least one service; and
   creating a list of the one or more service providers capable of performing the type of service requested, wherein the selecting of the one or more service providers comprises matching the type of service requested with information regarding each service provider to determine the one or more service providers.

4. The computer-implemented method of claim 3, further comprising:
transmitting the list of the one or more service providers to the at least one of the plurality of devices in order for the at least one of the plurality of devices to select the service provider from the list of the one or more service providers.

5. The computer-implemented method of claim 4, further comprising:
receiving a selection message from the at least one of the plurality of devices, wherein the selection message comprises the service provider selected from the list of the one or more service providers.

6. The computer-implemented method of claim 4, further comprising:
providing a service request message to the one or more service providers prior to the transmitting the list to the at least one of the plurality of devices, wherein the service request message comprises a transcription or a synopsis regarding the conference call between the plurality of devices and the type of service requested.

7. The computer-implemented method of claim 6, further comprising:
receiving a rejection message from the service provider after providing the informational message to the service provider; or
receiving an acceptance message from the service provider after providing the informational message to the service provider.

8. The computer-implemented method of claim 7, further comprising:
removing the service provider from the list of the one or more service providers when the rejection message is received; and
updating the list of the one or more service providers.

9. The computer-implemented method of claim 1, further comprising:
storing, in a database, the information received from each service provider.

10. An apparatus for dynamic conferencing during a conference call, comprising:
a processor; and
memory comprising instructions, wherein the instructions are configured to cause the processor to:
transmit messages between a plurality of devices during the conference call;
receive information from a plurality of service providers; and
connect the plurality of devices to a service provider based on a request for at least one service during the conference call, wherein
the messages comprise audio messages, video messages, or both, and
for each service provider, the information comprises information regarding at least a profession of the service provider, a skill set of the service provider, an availability of the service provider, a location of the service provider, a dialect of the service provider, fees for services provided by the service provider, a gender of the service provider, a score based on knowledge of the service provider, and a performance quality of the service provider.

11. The apparatus of claim 10, wherein the instructions are further configured to cause the processor to:
receive a request from at least one of the plurality of devices for the at least one service, wherein
the request comprises a type of service requested by the at least one of the plurality of devices.

12. The apparatus of claim 11, wherein the instructions are further configured to cause the processor to:
select one or more service providers from the plurality of service providers based on the request for the at least one service; and
create a list of the one or more service providers capable of performing the type of service requested,
wherein the selection of the one or more service providers comprises matching the type of service requested with information regarding each service provider to determine the one or more service providers.

13. The apparatus of claim 12, wherein the instructions are further configured to cause the processor to:
transmit the list of the one or more service providers to the at least one of the plurality of devices in order for the at least one of the plurality of devices to select the service provider from the list of the one or more service providers.

14. The apparatus of claim 13, wherein the instructions are further configured to cause the processor to:
receive a selection message from the at least one of the plurality of devices, wherein the selection message comprises the services provider selected from the list of the one or more service providers.

15. The apparatus of claim 13, wherein the instructions are further configured to cause the processor to:
provide a service request message to the one or more service providers prior to the transmitting of the list to the at least one of the plurality of devices, wherein the service request message comprises a transcription or a synopsis regarding the conference call between the plurality of devices and the type of service requested.

16. The apparatus of claim 15, wherein the instructions are further configured to cause the processor to:
receive a rejection message from the service provider after providing the informational message to the service provider; or
receive an acceptance message from the service provider after providing the informational message to the service provider, wherein, when a rejection message is received, remove the service provider from the list of the one or more service providers, and update the list of the one or more service providers capable of performing the type of service requested.

17. The apparatus of claim 10, wherein the instructions are further configured to cause the processor to:
receive information from each service provider; and
store, in a database, the information received from each service provider.

18. The apparatus of claim 10, wherein the apparatus is a private network, a local area network, or a wide area network.

19. A computer program embodied on a non-transitory computer-readable medium, the computer program, when executed, is configured to cause a processor to:
transmit messages between a plurality of devices during the conference call;
receive information from a plurality of service providers; and
connect the plurality of devices to a service provider based on a request for at least one service during the conference call, wherein the messages comprise audio messages or audio and video messages, and for each service provider, the information comprises information regarding at least a profession of the service provider, a skill set of the service provider, an availability of the service provider, a location of the service provider, a dialect of the service provider, fees for services provided by the service provider, a gender of the service provider, a score based on knowledge of the service provider, and a performance quality of the service provider.

\* \* \* \* \*